(12) United States Patent
Pyrkin et al.

(10) Patent No.: US 12,059,807 B2
(45) Date of Patent: Aug. 13, 2024

(54) SENSOR-FREE FORCE/TORQUE SENSING IN AN ARTICULATED ELECTROMECHANICAL ACTUATOR-DRIVEN ROBOT

(71) Applicant: Magna International Inc., Aurora (CA)

(72) Inventors: Anton Alexandrovich Pyrkin, St. Petersburg (RU); Alexey Alexeevich Vedyakov, St. Petersburg (RU); Vladislav Sergeevich Gromov, St. Petersburg (RU); Oleg Igorevich Borisov, St. Petersburg (RU); Igor Vladimirovich Petranevsky, Orel (RU); Alexey Olegovich Klyunin, St. Petersburg (RU)

(73) Assignee: Magna International Inc., Aurora (CA)

( * ) Notice: Subject to any disclaimer, the term of this patent is extended or adjusted under 35 U.S.C. 154(b) by 498 days.

(21) Appl. No.: 17/293,177

(22) PCT Filed: Nov. 12, 2018

(86) PCT No.: PCT/RU2018/000737
§ 371 (c)(1),
(2) Date: May 12, 2021

(87) PCT Pub. No.: WO2020/101516
PCT Pub. Date: May 22, 2020

(65) Prior Publication Data
US 2022/0009097 A1    Jan. 13, 2022

(51) Int. Cl.
*B25J 9/16* (2006.01)
*B25J 13/08* (2006.01)

(52) U.S. Cl.
CPC ........... *B25J 9/1653* (2013.01); *B25J 9/1607* (2013.01); *B25J 9/1633* (2013.01); *B25J 9/1641* (2013.01); *B25J 9/1692* (2013.01); *B25J 13/087* (2013.01)

(58) Field of Classification Search
CPC ...... B25J 9/1653; B25J 9/1607; B25J 9/1633; B25J 9/1641; B25J 9/1692; B25J 13/087; G05B 2219/40201; G05B 2219/40541
See application file for complete search history.

(56) References Cited

U.S. PATENT DOCUMENTS

| 9,707,684 B2 | 7/2017 | Ruiz Morales et al. |
| 2019/0283251 A1* | 9/2019 | Nakamoto ............... B25J 9/163 |
| 2020/0298403 A1* | 9/2020 | Nilsson ................... B25J 9/1692 |

FOREIGN PATENT DOCUMENTS

| CN | 103878791 A1 | 6/2014 |
| EP | 3385040 | 10/2018 |

(Continued)

OTHER PUBLICATIONS

Merlet, Jean-Pierre et al., "Jacobian, manipulability, condition number and accuracy of parallel robots", Proceedings of the 12th International Symposium on Robotics Research—ISSR, Oct. 12, 2005, 12 pages.

(Continued)

*Primary Examiner* — Abby Y Lin
*Assistant Examiner* — Dylan M Katz
(74) *Attorney, Agent, or Firm* — Honigman LLP

(57) ABSTRACT

A method for force or torque sensing in an electromechanical actuator-driven robot comprising one or more links, one or more joints, an end effector and a controller is provided, the method comprising: estimating a first set of load torques in one or more joints in a given configuration of the robot (Continued)

without external force or load applied to the end effector; identifying gravitational and frictional components in the first set of load torques; estimating a second set of load torques in the one or more joints in the given configuration of the robot with an external force or load applied to the end effector; calculating a difference between the second set of load torques and the first set of load torques, taking into account the identified gravitational and frictional components; calculating an external force or torque acting on the end effector based on the difference between the second set of load torques and the first set of load torques using a Jacobian matrix for the given configuration of the robot; and presenting the external force or torque in a Cartesian space. An apparatus for force or torque sensing in an electromechanical actuator-driven robot, the apparatus comprising at least one processor programmed to perform said method, a computer program which, when executed by at least one processor, causes the at least one processor to perform force or torque sensing in an electromechanical actuator-driven robot according to said method, and a non-transitory storage medium for storing said program are also provided. The technical result consists in improved precision of force or torque sensing on an end effector of an electromechanical actuator-driven robot in a manner which does not require using expensive force/torque sensors in robot joints.

8 Claims, 2 Drawing Sheets

(56) References Cited

FOREIGN PATENT DOCUMENTS

| KR | 20110048872 A | 5/2011 |
|----|---------------|--------|
| KR | 101233432 B1  | 2/2013 |
| KR | 20120037128 A | 4/2019 |

OTHER PUBLICATIONS

PCT Search Report for corresponding PCT International Application No. PCT/RU2018/000737 dated Aug. 23, 2019, 6 pages.
Siciliano, Bruno et al., "Robotics Differential Kinematics and Statics, Chapter 3", Robotics, Differential Kinematics and Statics, Chapter 3, Dec. 23, 2009, 56 pages.
Siciliano, Bruno, et al., "Robotics Dynamics, Chapter 7", Robotics, Modelling, Planning and Control, Dec. 23, 2009, 56 pages.
ABB Robotics, Application Manual—SoftMove, RobotWare 6.07, Rev. D, 2008-2018, 80 pgs.
Du & Nair, "Modeling and Compensation of Low-Velocity Friction With Bounds," IEEE Trans. Control Systems Technology, vol. 7, No. 1, 1999, pp. 110-121.
Katsura, et al., "Analysis and Experimental Validation of Force Bandwidth for Force Control," IEEE Trans. on Ind. Electronics, vol. 53, No. 3, 2006, pp. 922-928.
Katsura, et al., "Modeling of Force Sensing and Validation of Disturbance Observer for Force Control," IEEE Trans. on Ind. Electronics, vol. 54, No. 1, 2007, pp. 530-538.
Khalil & Praly, "High-Gain Observers in Nonlinear Feedback Control," Int. J. of Robust and Nonlinear Control, vol. 24, No. 6, 2013, 23 pgs.
Khalil, Hassan K., "Nonlinear Systems," 3rd Edition, Prentice Hall, New Jersey, 1996-2002, 748 pgs.
Koivumaki & Mattila, "Stability-Guaranteed Force-Sensorless Contact Force/Motion Control of Heavy-Duty Hydraulic Manipulators," IEEE Transactions on Robotics, vol. 31, No. 4, 2015, 17 pgs.
Kuntze, et al., "Fault Tolerant Supervisory Control of Human Interactive Robots," Workshop on Advanced Control and Diagnosis, Duisburg, Nov. 2003, 21 pgs.
Linderoth, et al., "Robotic Force Estimation Using Motor Torques and Modeling of Low Velocity Friction Disturbances," Proceedings of the IEEE/RSJ International Conference of Intelligent Robots and Systems, Tokyo, 2013, 8 pgs.
Matsumoto & Kosuge, "Collision Detection of Manipulator Based on Adaptive Control Law," Proceedings of the 2001 IEEE/ASME International Conference on Advanced Intelligent Mechatronics, Italy, 2001, pp. 177-182.
Ohishi, et al., "Force Control Without Force Sensor Based on Mixed Sensitivity H Design Method," Proceedings of the 1992 IEEE International Conference on Robotics and Automation, Nice, vol. 2, 1992, pp. 1356-1361.
Machine Translation of the Program for Rules Meeting 2014, Control Technology at Linkoping University of Technology, Jun. 3-4, 2014, Swedish IFAC, 14 pgs.
Simpson, et al., "Sensorless Force Estimation for Robots With Friction," in Proc. Australasian Conf. Robotics and Automation, New Zealand, 2002, pp. 94-99.
Spong, et al., "Robot Modeling and Control," 1st Edition, John Wiley & Sons, Inc., 2005, 419 pgs.
Toshiba, E-3 Sensor-less Compliance Control for Assembly Robots, accessed at http://www.toshiba-machine.co.jp/en/technology/tech catalog/e3.html, Sep. 2012.

* cited by examiner

SENSOR-FREE FORCE/TORQUE SENSING IN AN ARTICULATED ELECTROMECHANICAL ACTUATOR-DRIVEN ROBOT

This application is the United States National Phase of PCT RU2018/000737, filed 12 Nov. 2018, which is incorporated herein by reference.

FIELD OF INVENTION

The invention relates to industrial robotics, and more specifically to force/torque sensor-free sensing of a force and/or torque applied to an end effector of an articulated industrial robot driven by electromechanical actuators.

PRIOR ART

A major share of robots is now used in industrial manufacturing processes to replace humans in dangerous or hard operations such as welding, polishing, assembly, sorting workpieces, etc.

Quality of operations performed by robots can be significantly increased, if so-called force feedback is used to regulate interaction forces between the robot and the environment or manipulated objects. This additional signal can be highly useful in a range of use cases. For example, desired quality of material processing cannot be achieved without information on interaction forces. A robot which assembles two male-female parts can adjust their relative orientation to fit one into another basing on information provided by this feedback.

For safety reasons, most of industrial robots having just basic functionality are allowed to operate within a fenced area, so as to prevent collisions with humans. One of recent trends in robotics is the development of so-called collaborative robots, which can be used side by side with humans without exposing the latter to health risks. Safety force feedback loop is used to monitor all external torques of each joint of a robot. In case of exceeding a nominal or expected level of loads the system can discard the current operation and switch to a compliant mode, in which reference for joints is provided only by force feedback so as to prevent harm to humans.

One of the previously used approaches assumes physical installation of sensors to measure all needed states of the system. This is the simplest strategy, since all comprehensive plant status information is available for the controller online (see FIG. 1).

Another known approach is based on output control, which is more challenging, since only regulated signal is fed to a controller. One can design a state observer to be integrated into the controller structure in order to reconstruct the estimates of system states, which can be further used in the control law (see FIG. 1). For example, there is a well-known technique of a high-gain observer [see e.g. Khalil, H. K. (1996) Nonlinear Systems. Prentice-Hall, New Jersey, hereinafter (1), or Khalil, H. K., & Praly, L. (2014). High-gain observers in nonlinear feedback control. International Journal of Robust and Nonlinear Control, 24(6), 993-1015, hereinafter (2)], which is widely used in a number of output control studies.

The third way is a sensorless approach, which is highly useful if the regulated signal is not measurable (see FIG. 2). This method is based on advanced observer design fed by internal signals, which are available from partial state components of the system. Sensorless approach has been studied on a number of test models including electric drives, solar panels, levitating balls, etc.

Obviously, the first two of the above-mentioned approaches require a force/torque sensor installed at the robot in order to provide at least the output signal per se. This is in fact a widely used practice in industrial robot-based automation, when force control is needed. However, use of sensors might not seem reasonable in terms of financial expenses. Especially it is true for a number of simple industrial operations, in which force-feedback is not a primary tool, but might be used just to improve flexibility of the process, complicate executable scripts, etc. From this point of view, the third way is considered as a potentially useful and convenient strategy to be developed. It is expected that it can be used either as a stand-alone approach to provide force feedback, or as an auxiliary tool to improve reliability of measurements provided by sensors.

The approach proposed in source (1) is applicable in practice only in a force control system based on both $H^\infty$ acceleration controller and $H^\infty$ force observer. Proposed force control system has no force sensor and is designed based on a mixed sensitivity $H^\infty$ design method.

The main problem involved in force estimation is friction in joints. M. Linderoth, A. Stolt, A. Robertsson and R. Johansson, "Robotic force estimation using motor torques and modeling of low velocity friction disturbances," 2013 IEEE/RSJ International Conference on Intelligent Robots and Systems, Tokyo, 2013, pp. 3550-3556. doi: 10.1109/IROS.2013.6696862 (hereinafter (3)) present a method for force estimation that accounts for velocity-dependent uncertainty of the Coulomb friction and combines data from several joints to produce accurate estimates. The estimate is calculated by solving a convex optimization problem in real time. Disadvantage of this approach is that it requires large computing power and high speed for solving the optimization problem, in comparison with other approaches considered. However, the speed of the entire control system is often limited by the frequency of the robot manipulator cabinet.

J. Koivumäki and J. Mattila, "Stability-Guaranteed Force-Sensorless Contact Force/Motion Control of Heavy-Duty Hydraulic Manipulators," in IEEE Transactions on Robotics, vol. 31, no. 4, pp. 918-935, August 2015. doi: 10.1109/TRO.2015.2441492 (hereinafter (4)) suggest a force sensorless high-performance contact force/motion control approach for multiple-degree-of-freedom hydraulic manipulators. Controller design for the manipulator is based on a recently introduced virtual decomposition control approach. As a significant novelty, the end effector contact force is directly estimated from the manipulator's cylinder pressure data, which provides a practical solution for heavy-duty contact force control without engaging fragile force/torque sensors. This solution may be considered as the closest prior art to the present invention.

Starting from the prior art methodologies described above, the object of the present invention is to propose a sensorless technique which can be applied to a robotic arm so as to reconstruct estimates of external force/torque acting on its end effector or/and its links, in which use of force/torque sensors is excluded. The inventive technique involves identifying gravitational and frictional components of a mathematical model of a robot in its particular configuration.

SUMMARY OF INVENTION

The present invention suggests a solution for sensing an external force or torque acting on an end effector of a robot driven by electromechanical actuators. These forces or torques on the end effector are mainly caused by interaction of the robot with the environment or manipulated objects. The primary problem addressed by the present invention is to provide reliable feedback on the external force or torque on the end effector of the robot. Technical result of the present invention consists in improved precision of force or torque sensing on an end effector of an electromechanical actuator-driven robot in a manner which does not require using expensive force/torque sensors in robot joints. Obviating the need for using force/torque sensors also provides for a cheaper and more cost-effective robot.

First of all, definitions of some notions of control theory and robotics, which are extensively used below, are provided.

State of a system is a vector comprised of variables, which represent inner system signals completely describing internal processes.

Controller (or control law) is a subsystem fed by a feedback signal and intended to stabilize the output of a plant.

Links are rigid bodies that form a robotic arm, which are connected in series by joints.

Joints represent interconnection of two adjacent links driven by actuators, the latter being e.g. electromechanical, hydraulic or pneumatic. Elementary joint types can be either revolute or prismatic. Only electromechanical actuators are considered within this application.

Generalized (joint) coordinates are variables which describe a positional relation of two adjacent robot links. They can be angular if the joint is revolute, or linear if the joint is prismatic. The robot with all joints being revolute is called articulated.

Configuration is a set of all generalized (joint) coordinates of the robot, which uniquely define it in space.

End effector is a gripper or a tool mounted to the last link of the robot and intended to directly contact the environment or manipulated objects.

Notion of repeatability within this application refers to a property of producing the same joint torques relevant to a particular configuration after the robot takes up this position from any random configuration.

Having thus formulated the basic concepts used in the present application, aspects of the present invention will now be summarized prior to the detailed description of their embodiments. It should be noted, however, that this brief summary is merely intended to be an aid for a person skilled in the art to ascertain the essence of invention, but should not be used in any way to define or restrict its scope, which is only defined by the appended claims.

In an aspect, the present invention is directed to a method for force or torque sensing in an electromechanical actuator-driven robot comprising one or more links, one or more joints, an end effector and a controller, the method comprising: estimating a first set of load torques in one or more joints in a given configuration of the robot without external force or load applied to the end effector; identifying gravitational and frictional components in the first set of load torques; estimating a second set of load torques in the one or more joints in the given configuration of the robot with an external force or load applied to the end effector; calculating a difference between the second set of load torques and the first set of load torques, taking into account the identified gravitational and frictional components; calculating an external force or torque acting on the end effector based on the difference between the second set of load torques and the first set of load torques using a Jacobian matrix for the given configuration of the robot; and presenting the external force or torque in a Cartesian space.

In another aspect, the invention provides an apparatus for force or torque sensing in an electromechanical actuator-driven robot comprising one or more links, one or more joints, an end effector and a controller, the apparatus comprising at least one processor programmed to: estimate a first set of load torques in one or more joints in a given configuration of the robot without external force or load applied to the end effector; identify gravitational and frictional components in the first set of load torques; estimate a second set of load torques in the one or more joints in the given configuration of the robot with an external force or load applied to the end effector; calculate a difference between the second set of load torques and the first set of load torques, taking into account the identified gravitational and frictional components; calculate an external force or torque acting on the end effector based on the difference between the second set of load torques and the first set of load torques using a Jacobian matrix for the given configuration of the robot; and present the external force or torque in a Cartesian space.

In yet another aspect, the invention provides a computer program which, when executed by at least one processor, causes the at least one processor to perform force or torque sensing in an electromechanical actuator-driven robot comprising one or more links, one or more joints, an end effector and a controller, the computer program comprising processor-executable code for: estimating a first set of load torques in one or more joints in a given configuration of the robot without external force or load applied to the end effector; identifying gravitational and frictional components in the first set of load torques; estimating a second set of load torques in the one or more joints in the given configuration of the robot with an external force or load applied to the end effector; calculating a difference between the second set of load torques and the first set of load torques, taking into account the identified gravitational and frictional components; calculating an external force or torque acting on the end effector based on the difference between the second set of load torques and the first set of load torques using a Jacobian matrix for the given configuration of the robot; and presenting the external force or torque in a Cartesian space.

In one more aspect, the invention relates to a non-transitory computer readable medium having stored thereon the computer program of the previous aspect.

In an embodiment, the first set of load torques and the second set of load torques are estimated based on the measured joint currents. In an embodiment, the invention further comprises injecting a high-frequency low-amplitude (HFLA) signal to the joints to reduce the torque noise so as to improve repeatability of joint current measurements. In an embodiment, the invention further comprises iteratively analyzing condition number values of the Jacobian matrix for the given configuration so as to detect singularities and identify operational regions in the robot workspace, where rate of preciseness of the calculations using the Jacobian matrix is acceptable; wherein presenting the external force or torque in a Cartesian space comprises transforming the external force or torque from a joint space to the Cartesian space using the Jacobian inversion or pseudo inversion, taking into account the identified operational regions, where the rate of preciseness of the calculations using the Jacobian matrix is acceptable. In an embodiment, the Jacobian matrix relates the joint torques to the external force or torque acting on the end effector.

BRIEF DESCRIPTION OF THE DRAWINGS

Figures illustrate various embodiments of the present invention and should be used only as an aid in understanding its fundamental principles and modes of operation but not for defining or restricting the scope of invention in any manner. Similar elements are denoted with similar reference numerals throughout the figures.

In the figures.

EMBODIMENTS OF INVENTION

Now the invention will be explained in more detail with reference to its exemplary embodiments as illustrated on the above-mentioned figures. It should be noted that this detailed description is intended for providing a deeper understanding of the principles of invention and modes of its operation, but not for defining and/or restricting its scope in any way.

The idea underlying the proposed invention consists in obviating the need for using expensive force/torque sensors in joints of an electromechanical actuator-driven robot comprising one or more links, one or more joints, an end effector, in order to sense one or more forces and/or torques which are applied to the end effector of the robot. These forces or torques on the end effector are mainly caused by interaction of the robot with the environment or manipulated objects.

As shown above, prior art solutions rely on using force/torque sensors in joints of the electromechanical actuator-driven robot so as to measure one or more forces or torques which are applied to the end effector of the robot. In contrast to the prior art, the present invention advantageously obviates the need for such force/torque sensors, instead of which a "virtual sensor" is provided, which relies on signals typically provided by a robot controller, such as joint current signals, coordinate signals, joint angle signals, said signals being processed by a computer connected to the robot controller. In this manner, the invention does not require hardware changes to existing standard equipment which is typically included in a an electromechanical actuator-driven robot, and it can be used in various branches of industry to perform complicated operations, in which regulation of interaction forces between the robot and manipulated object(s) and/or the environment is crucial.

Figure 1:
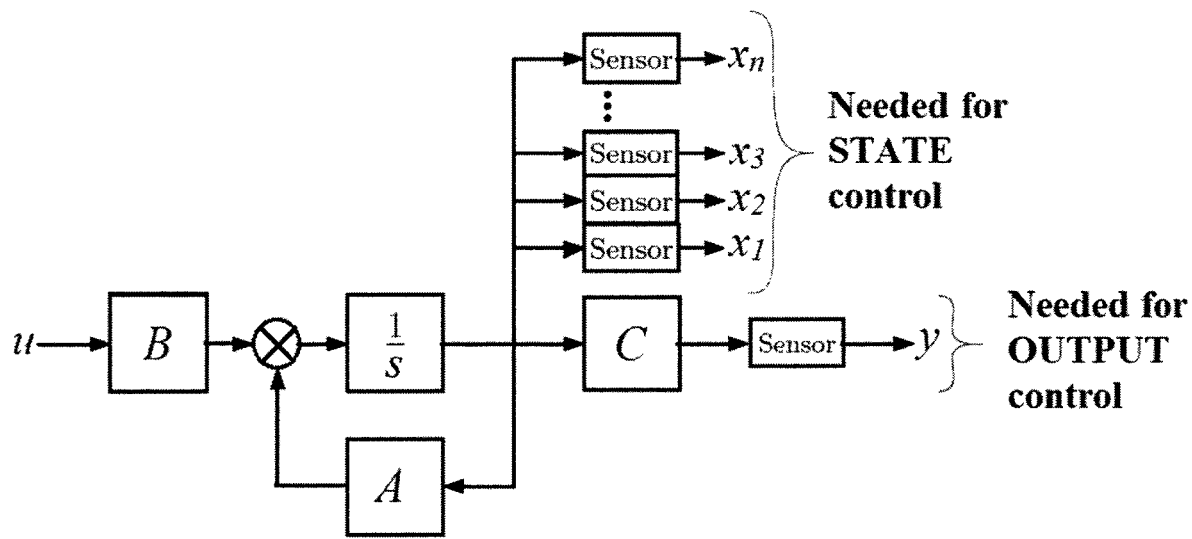
FIG. 1 shows a prior art solution which uses force/torque sensors for state control and output control of the known robot.
Figure 2:
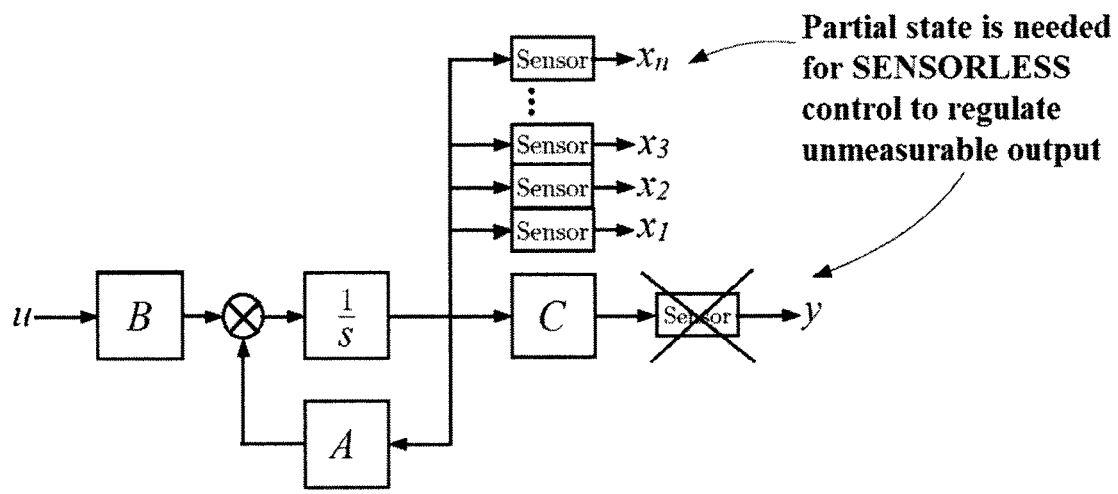
FIG. 2 illustrates a "sensorless" force/torque sensing technique which does not use force/torque sensor(s) for output control.

In particular, FIGS. 1 and 2 show two types of force/torque sensing techniques, a conventional one using a force/torque sensor for output control (see FIG. 1) and a "sensorless" technique which does not make use of the force/torque sensor for output control. The meaning of the reference signs in FIGS. 1 and 2 is as follows:

A,B,C are matrices of the corresponding dimensions containing parameters of the mathematical model of the system. A is the state matrix, B is the input matrix (vector), C is the output matrix (vector).

u is the input signal (control signal).

y is the output signal (regulated signal).

$x=[x1\ x2\ x3\ \ldots\ xn]$ is the state vector of the system, where $x1\ x2\ x3\ \ldots\ xn$ are state variables.

n is the system order.

The invention is directed to a method for force or torque sensing in an electromechanical actuator-driven robot comprising one or more links, one or more joints, an end effector and a controller. The method comprises distinct steps which will be described hereinbelow. It should be noted that, although the steps are described in a certain order, this does not necessarily restrict the scope of the invention to the certain order, in which these steps are described. In particular, at least some of the steps may be performed in a different order as compared to the described one; one or more steps may be performed simultaneously; other steps may be included in between the described ones in particular advantageous embodiments of the invention, as will be apparent for a person skilled in the art from careful reading of the present specification.

At step S1, the method for force or torque sensing in an electromechanical actuator-driven robot begins. At S2, a first set of load torques in one or more joints in a given configuration of the robot without external force or load applied to the end effector is estimated. Here, it should be noted that "configuration of the robot" means a specific combination of angles and/or coordinates which describe the position of each of the one or more joints of the robot in a coordinate space which denotes the robot workspace. Data signal(s) reflecting said angle(s) and/or coordinates are typically provided by sensors which are well known in the art to the controller of the robot, which controller may output these signals e.g. to an external computer that controls the operation of the robot. The "given configuration" is a specific configuration which may be typical for a certain stage of a typical operation performed by a given robot in the course of its typical operation within its workspace. It should be noted that the task of estimating the load torques and/or the one or more forces or torques on the end effector according to the invention is performed in a "stationary" condition of the robot.

Figure 3:
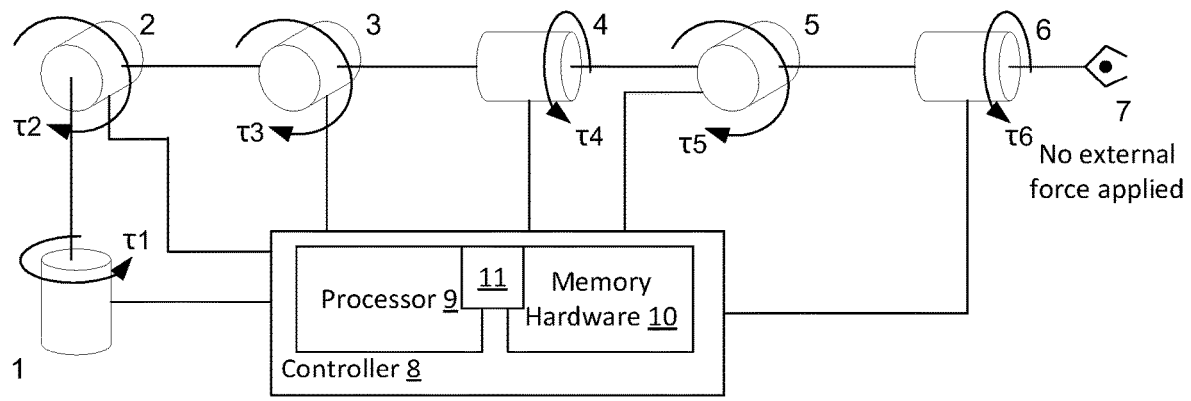
FIG. 3 is a scheme which illustrates estimating "load-free" torques in a kinematic chain of a robot with multiple joints and an end effector in a configuration where no external force is applied to the end effector.

An exemplary "kinematic chain" of a robot with multiple links and multiple joints and an end effector is shown on FIG. 3. Here, the robot comprises six joints 1-6 and an end effector 7. Torques on the joints 1-6 are denoted by $\tau 1\text{-}\tau 6$.

The first set of load torques ($\tau 1\text{-}\tau 6$), which may be also termed "load-free" torques, is estimated at S2 on the basis of a signal output by the controller of the robot, said signal being, in a particular embodiment, a current signal for (each) of the one or more joints of the robot. Said signal will be referred to as "joint current signal" hereinbelow. It should be noted that the first set of load torques includes gravitational and frictional components, but does not include any components related to torque(s) or force(s) applied to the end effector, since no load is applied to the latter at this step.

At S3, said gravitational and frictional components in the first set of load torques are identified. This may be done using a mathematical model of the robot for the given configuration, such mathematical model being created in advance.

Figure 4:
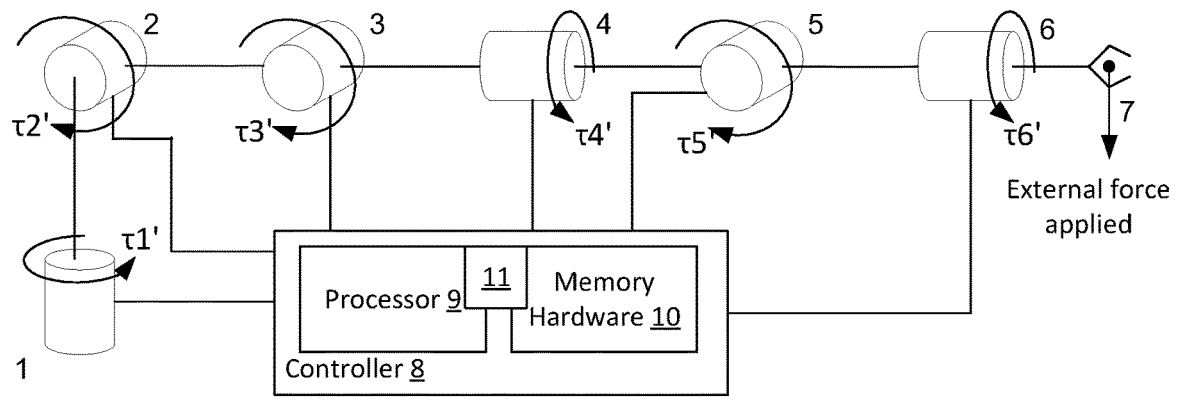
FIG. 4 is a scheme which illustrates estimating load torques in the same kinematic chain as on FIG. 3 in a configuration where an external force is applied to the end effector.

At S4, a second set of load torques ($\tau 1'\text{-}\tau 6'$) (see FIG. 4) is estimated for the joints 1-6 in the same given configuration of the robot, this time with an external force or load applied to the end effector 7. Again, the "estimation" is based on the joint current signal provided by the controller of the robot.

At S5, a difference between the second set of load torques (τ1'-τ6') and the first set of load torques (τ1-τ6) is calculated by the computer, taking into account the gravitational and frictional components identified at S3.

At S6, external force or torque acting on the end effector is calculated by the computer based on the difference between the second set of load torques (τ1'-τ6') and the first set of load torques (τ1-τ6), using a Jacobian matrix for the given configuration of the robot.

Jacobian matrix needed to relate the difference in joint torques calculated at S6 to the forces applied to the end effector and vice versa is derived by solving forward kinematics of the robot, by way of an example, using the Denavit-Hartenber (DH) convention (see e.g. Mark W. Spong, Seth Hutchinson, and M. Vidyasagar, Robot Modeling and Control, First Edition, Wiley, 2005). Use of the DH convention is a classical method of solving forward kinematics of the robot, which may be relied upon in the implementation of the present invention.

A Jacobian matrix is derived for a plurality of possible configurations of the robot within its working space, said configurations being described, in particular, by forces and/or torques in the robot joints. Then, the inversion (or pseudo-inversion) of the transpose Jacobian matrix is used to transform the external force and/or torque derived from the Jacobian matrix, into a Cartesian coordinate space describing the spatial configuration of the robot. According to the proposed solution, it is crucial to reveal the dependency between the joint coordinates and the condition number of the Jacobian matrix. Calculation of external force/torque requires pseudo-inversion of the Jacobian matrix. This operation is typically computed by numerical approaches. Accuracy obtained by such methods depends on the condition number of a Jacobian matrix being inverted. The smaller the condition number of the Jacobian matrix, the smaller the error of the matrix inversion and, as a consequence, the smaller the error of external force/torque calculation.

Then, at S7 the external force or torque calculated using said Jacobian matrix inversion is presented in a Cartesian space. At S8, the method ends.

It should be noted that, in some configurations of the robot, there may be possible singularities caused by Jacobian matrix inversion, at which the calculation of the external force or torque using the Jacobian matrix cannot be carried out.

To detect said singularities and discover operational regions in the robot workspace, where external force or torque computations are precise enough, in an advantageous embodiment the method may comprise a step S9 of iteratively analyzing condition number values of the Jacobian matrix of S6 for the given configuration so as to detect singularities and identify operational regions in the robot workspace, where rate of preciseness of the calculations using the Jacobian matrix is acceptable.

Acceptability of the rate of preciseness of calculations using the Jacobian matrix for a given operational region of the robot may be rated e.g. in percent values, where a certain percent value (e.g. 20%, 30%, 50% or the like) threshold may apply.

In such particular advantageous embodiment, presenting the external force or torque in a Cartesian space may comprise a step S10 of transforming the external force or torque from a joint space to the Cartesian space using the Jacobian inversion or pseudo inversion, taking into account the identified operational regions, where the above-mentioned rate of preciseness of the calculations using the Jacobian matrix is acceptable (i.e. the rate of preciseness is above said threshold).

In another advantageous embodiment, the invention further solves a problem of repeatability of joint current measurements in a stationary mode of the robot, which joint current measurements underlie the estimation of the first and second sets of joint torques as described above, by reducing the so-called torque noise. Ideally, torques generated by the robot actuators with gearboxes for a given configuration and a given payload are always supposed to be the same. It means that one could expect the same values of the joint torques to be measured each time for the same configuration with the same payload. In fact, this perception is not true. In practice, friction forces can vary during the operation of the robot. The main difficulty of the stationary mode, in which the joint torques are measured or estimated, in comparison to the dynamical one is static friction (also referred to in the art as "stiction"), which is hard to identify in order to compensate it afterwards.

Figure 5:
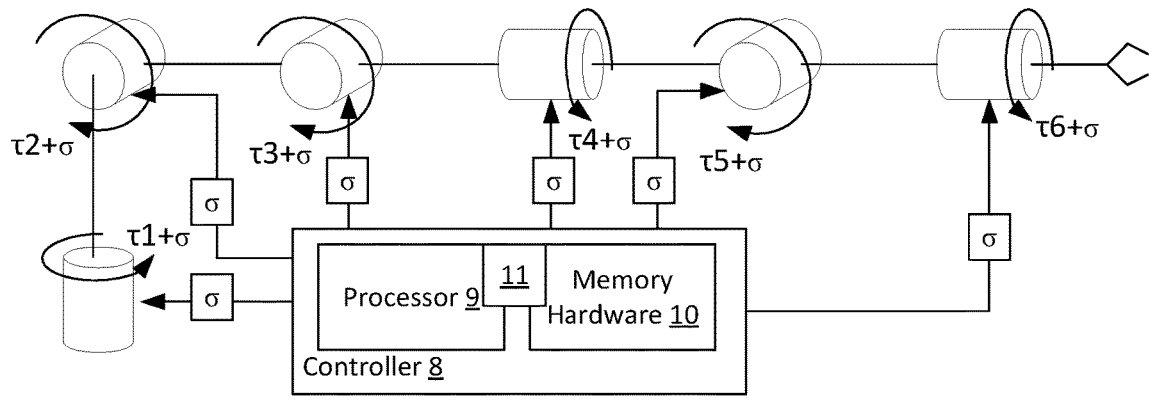
FIG. 5 illustrates an embodiment of the present invention, in which HFLA signal is injected to the robot joints in a kinematic chain of a robot with multiple joints.

To ensure repeatability of estimated joint torques, in an embodiment of the invention illustrated on FIG. 5 a high-frequency low-amplitude (HFLA) signal σ is injected to the robot joints to reduce noise in the measurements (see FIG. 5). Use of the HFLA signal in an advantageous embodiment of the invention enables a significant decrease in the effect of "stiction" on the measurements. This signal has the following form $$\delta(k)=(-1)^k \bar{\delta},$$

where $\bar{\delta} \in \mathbb{R}^n$ is the signal amplitude (rad), n is the number of DOF of the robot, k is the sampling number. The sampling frequency is about 30 Hz. The signal HFLA generates non-visible micro-vibrations in the robot joints.

In practice, an additional calibration technique can be used to increase the precision of all calculations. A table of scale factors can be computed on the basis of multiple experiments carried out using payloads of various control weights, known a priori. The resultant external force/torque signals afterwards can be multiplied by these scale factors to suppress unaccounted effects. A software application with a graphical user interface has been designed to use full functionality of the proposed technique applied to a robotic arm. This software supports several modes such as visualization of the projections of the external force applied to the end effector, torque-control mode, which renders a robot to be compliant and the mode of estimation of weight of items placed at the end effector.

In another aspect, the invention is directed to an apparatus for force or torque sensing in an electromechanical actuator-driven robot comprising one or more links, one or more joints, an end effector and a controller 8. The apparatus operates substantially as described above and implements the inventive method of force or torque sensing. In particular, the apparatus may be embodied as a computer 8 comprising at least one processor 9 programmed with a computer program, computer program element(s) and/or computer program code which, when executed by the at least one processor 9, causes the at least one processor to perform the steps S1-S8 and/or optional steps S9, S10 as described above.

The apparatus according to the present invention may exist in the form of one or more processors, microprocessors, computers, in particular general purpose computers or specialized computers etc. as is well known to persons skilled in the art. It may be implemented in a single computer or one or more remote computers distributed over a network. Other components such as one or more memories, servers, sensors, transceivers etc. may be used where applicable.

The invention is also directed to a computer program which, when executed by at least one processor, such as the at least one processor of the apparatus as characterized above, causes the at least one processor to perform force or torque sensing in an electromechanical actuator-driven robot, the computer program comprising processor-executable code for performing the steps S1-S8 and/or optional steps S9, S10 as described above.

The computer program may be embodied in a non-transitory computer readable medium 10. The computer program 11 may be stored in one or more memory devices 10 of one or more computers 8 and/or distributed and/or transferred via one or more networks, such as wired or wireless communication networks. In particular, the program may be stored in, and distributed through, a non-transitory computer-readable recording medium such as a flexible disk, a compact disc read only memory (CD-ROM), a digital versatile disc (DVD) or a magneto-optical disc (MO), and may be installed into a computer to provide the computer that may implement all or some of the above-described individual functions.

As mentioned above, the invention obviates the need to install force/torque sensors or any additional equipment to establish a force-feedback loop. In particular, the invention proposes a computer-implemented software solution, which could be easily applied to the robot without any physical changes or hardware modifications of its mechanical or electrical components. However, the invention should not be construed in any manner as being a mere software solution unrelated to any specific material or technical means. The invention proposes to use available measurements of joint currents to estimate joint torques and then to identify gravitational and friction components of the robot model. Also, position, angle and/or coordinate data available from the robot joints via the controller 8 of the robot is also derived in order to be used in the inventive methodology. This data can be used to establish force-feedback loop without force/torque sensors.

The described methodology may be embodied by any software development environments known to a person skilled in the art, as well as in any suitable programming languages or in the form of machine-executable code, as is well known in the art.

The invention may be used in robotic applications of smart manufacturing to control a robot using force feedback by means of software tools and minor available measurements of the robot joints. Robots with such advanced force feedback regulation technique implemented can be used to perform more complex industrial operations, in which interaction with the environment is crucial. The invention also allows to render a regular robot to a collaborative one, which, in turn, can be used side by side with humans without risks of injury or any harm to their health.

It should also be noted that the invention may also take other forms as compared to what is described hereinabove, and certain components, modules, elements, functions may be implemented as software, hardware, firmware, integrated circuits, FPGAs etc. where applicable. Examples of non-transitory computer-readable medium suitable for storing said computer program or its code, instructions or computer program elements or modules may include any kind of a non-transitory computer-readable medium which is apparent for a person skilled in the art.

All prior art references cited and discussed in this document and also provided in the Citation list presented hereinbelow are hereby included in the present disclosure by reference in their entirety where applicable.

While the present invention has been shown and described with reference to various embodiments thereof, it will be understood by those skilled in the art that various changes in form and details may be made therein without departing from the scope of the present disclosure, which is defined only by the appended claims and their equivalents.

CITATION LIST

1. K. Ohishi, M. Miyazaki, M. Fujita and Y. Ogino, "Force control without force sensor based on mixed sensitivity H∞ design method," Proceedings 1992 IEEE International Conference on Robotics and Automation, Nice, 1992, pp. 1356-1361 vol. 2. doi: 10.1109/ROBOT.1992.220161
2. Du, H. and Nair, S. (1999). Modeling and compensation of low velocity friction with bounds. IEEE Trans. Control Systems Technology, 7(1), 110-121.
3. Simpson, J., Cook, C., and Li, Z. (2002). Sensorless Force Estimation for Robots with Friction. In Proc. Australasian Conf. Robotics and Automation, 94-99. Auckland, New Zealand.
4. Katsura, S., Matsumoto, Y., Ohnishi, K. (2006). Analysis and experimental validation of force bandwidth for force control. IEEE Trans. Ind. Electr. 53(3):922-927
5. Katsura, S., Matsumoto, Y., Ohnishi, K. (2007). Modeling of force sensing and validation of disturbance observer for force control. IEEE Trans. Ind. Electr. 54(1):530-537.
6. Kosuge, K., Matsumoto, T. (2001). Collision detection of manipulator based on adaptive control law. Proceedings of IEEE/ASME International Conference on Advanced Intelligent Mechatronics, 117-122
7. Kuntze, H.-B., Frey, W., Giesen, K., Milighetti, G. (2003). Fault tolerant supervisory control of human interactive robots. Proceedings of IFAG Work on Advanced Control and Diagnosis, Duisburg, 55-60.
8. M. Linderoth, A. Stolt, A. Robertsson and R. Johansson, "Robotic force estimation using motor torques and modeling of low velocity friction disturbances," 2013 IEEE/RSJ International Conference on Intelligent Robots and Systems, Tokyo, 2013, pp. 3550-3556. doi: 10.1109/IROS.2013.6696862
9. Andreas Stolt*Anders Robertsson*Rolf Johansson Sensorless Force Control for Industrial Robots, reglermote 2014
10. J. Koivumäki and J. Mattila, "Stability-Guaranteed Force-Sensorless Contact Force/Motion Control of Heavy-Duty Hydraulic Manipulators," in IEEE Transactions on Robotics, vol. 31, no. 4, pp. 918-935, August 2015. doi: 10.1109/TRO.2015.2441492
11. ABB Robotics. Application manual—SoftMove, 2011. Robot documentation M2004, rev E, RW5.14.
12. Toshiba. Sensor-less compliance control for assembly robots. http://www.toshiba-machine.co.jp/en/technology/tech catalog/e3.html, September 2012
13. Jang Pyung Hoon, Jae Won Jung, Method for estimating external force On robotic system using time-delay estimation, KR101233432B1, 2013 Feb. 14
14. Emilio Ruiz Morales, Carlos Correcher Salvador, Force estimation for a minimally invasive robotic surgery system, U.S. Pat. No. 9,707,684B2, 2017-07-18

15. Cho Hyun-chul, A method of sensorless force control in cartesian coordinates, KR20110048872A, 2011 May 12
16. Wu Haibin, Wu Guokui, Industrial robot external-sensor-free external force detection method, CN103878791B, 2016 Mar. 9

The invention claimed is:

1. An apparatus for force or torque sensing in an electromechanical actuator-driven robot comprising one or more links, one or more joints, an end effector and a controller, the apparatus comprising at least one processor programmed to:
    inject a high-frequency low-amplitude (HFLA) signal to the joints to reduce the torque noise so as to improve repeatability of joint current measurements;
    estimate a first set of load torques in one or more joints in a given configuration of the robot without external force or load applied to the end effector;
    identify gravitational and frictional components in the first set of load torques;
    estimate a second set of load torques in the one or more joints in the given configuration of the robot with an external force or load applied to the end effector;
    calculate a difference between the second set of load torques and the first set of load torques, taking into account the identified gravitational and frictional components;
    calculate an external force or torque acting on the end effector based on the difference between the second set of load torques and the first set of load torques using a Jacobian matrix for the given configuration of the robot;
    iteratively analyze condition number values of the Jacobian matrix for the given configuration so as to detect singularities and identify operational regions in the robot workspace, where rate of preciseness of the calculations using the Jacobian matrix exceeds a threshold;
    calibrating the calculated external force or torque using scale factors computed for payloads of various control weights, known a priori; and
    present the external force or torque in a Cartesian space.

2. The apparatus of claim 1, wherein the first set of load torques and the second set of load torques are estimated based on the joint current measurements.

3. The apparatus of claim 1,
    wherein presenting the external force or torque in a Cartesian space comprises transforming the external force or torque from a joint space to the Cartesian space using the Jacobian inversion or pseudo inversion, taking into account the identified operational regions, where the rate of preciseness of the calculations using the Jacobian matrix exceeds a threshold.

4. The apparatus of claim 1, wherein the Jacobian matrix relates the joint torques to the external force or torque acting on the end effector.

5. A non-transitory computer readable medium having stored thereon a computer program which, when executed by at least one processor, causes the at least one processor to perform force or torque sensing in an electromechanical actuator-driven robot comprising one or more links, one or more joints, an end effector and a controller, the computer program comprising processor-executable code to perform operation comprising:
    injecting a high-frequency low-amplitude (HFLA) signal to the joints to reduce the torque noise so as to improve repeatability of joint current measurements;
    estimating a first set of load torques in one or more joints in a given configuration of the robot without external force or load applied to the end effector;
    identifying gravitational and frictional components in the first set of load torques;
    estimating a second set of load torques in the one or more joints in the given configuration of the robot with an external force or load applied to the end effector;
    calculating a difference between the second set of load torques and the first set of load torques, taking into account the identified gravitational and frictional components;
    calculating an external force or torque acting on the end effector based on the difference between the second set of load torques and the first set of load torques using a Jacobian matrix for the given configuration of the robot;
    iteratively analyzing condition number values of the Jacobian matrix for the given configuration so as to detect singularities and identify operational regions in the robot workspace, where rate of preciseness of the calculations using the Jacobian matrix exceeds a threshold;
    calibrating the calculated external force or torque using scale factors computed for payloads of various control weights, known a priori; and
    presenting the external force or torque in a Cartesian space.

6. The non-transitory computer readable medium having stored thereon the computer program of claim 5, wherein the first set of load torques and the second set of load torques are estimated based on the joint current measurements.

7. The non-transitory computer readable medium having stored thereon the computer program of claim 5,
    wherein presenting the external force or torque in a Cartesian space comprises transforming the external force or torque from a joint space to the Cartesian space using the Jacobian inversion or pseudo inversion, taking into account the identified operational regions, where the rate of preciseness of the calculations using the Jacobian matrix exceeds a threshold.

8. The non-transitory computer readable medium having stored thereon the computer program of claim 5, wherein the Jacobian matrix relates the joint torques to the external force or torque acting on the end effector.

* * * * *